(12) United States Patent
Beylerian et al.

(10) Patent No.: US 7,698,988 B2
(45) Date of Patent: Apr. 20, 2010

(54) BRAKE BOOSTER FOR A HAND BRAKE

(75) Inventors: Bruno Beylerian, Louvres (FR);
Aleksander Hurwic, Paris (FR)

(73) Assignee: Robert Bosch GmbH (DE)

( * ) Notice: Subject to any disclaimer, the term of this patent is extended or adjusted under 35 U.S.C. 154(b) by 319 days.

(21) Appl. No.: 11/863,343

(22) Filed: Sep. 28, 2007

(65) Prior Publication Data

US 2008/0087132 A1    Apr. 17, 2008

(30) Foreign Application Priority Data

Oct. 13, 2006    (FR)    ................... 06 09032

(51) Int. Cl.
*F15B 9/10*    (2006.01)
(52) U.S. Cl. ................... 91/369.2
(58) Field of Classification Search ........... 91/369.2
See application file for complete search history.

(56) References Cited

U.S. PATENT DOCUMENTS 3,150,493 A    9/1964    Rike 4,625,516 A * 12/1986 Gaiser ........................ 60/554
4,667,567 A * 5/1987 Morimoto ................ 91/376 R

FOREIGN PATENT DOCUMENTS

| DE | 1430412 | 12/1968 |
|---|---|---|
| DE | 3906529 | 9/1990 |
| GB | 2058977 | 4/1981 |

* cited by examiner

*Primary Examiner*—F. Daniel Lopez
(74) *Attorney, Agent, or Firm*—Michael Best & Friedrich LLP

(57) ABSTRACT

The invention relates to a brake booster intended to transmit handbrake commands. This booster essentially comprises a plunger (3) able to move axially under the command of the control rod (1). An enclosure (2) contains a working chamber (21) and a vacuum chamber (20) which are separated by a wall (22) able to move axially under the effect of the plunger (3) and/or of a difference in pressure between the vacuum chamber and the working chamber. A three-way valve (4) controlled by the plunger (3) allows the working chamber (21) to be connected either to the vacuum chamber or to atmospheric air. Finally, a bearing piece (17) controlled by the moving wall (22) allows the control rod (1) to be driven along.

16 Claims, 1 Drawing Sheet

US 7,698,988 B2

BRAKE BOOSTER FOR A HAND BRAKE

BACKGROUND OF THE INVENTION

The invention relates to a brake booster for a manually controlled brake and to a hand brake applying such a booster.

In general, hand brakes known in the field of automotive engineering employ a lever allowing wheel brakes to be operated via a transmission involving cables and/or linkages. These brakes generally act on the rear wheels of the vehicle.

Applying and releasing these brakes are operations that are not necessarily easy for certain users to perform. This is why certain vehicles are now fitted with parking brakes that are motorized or controlled by an actuator. Certain vehicles are even fitted with automatic parking brakes which come into operation as soon as the engine stops.

However, these systems display certain disadvantages. In particular, these systems are unable, except with great difficulty or alternatively are entirely unable, to take account of the conditions in which the vehicle has stopped, such as the inclination of the ground on which the vehicle has stopped. These systems apply a practically standard braking force to the wheel brake devices. This being the case, under certain situations in which the vehicle has come to a standstill, the braking force is excessive. A smaller force could be applied and prove entirely satisfactory. This then results in additional and needless wear and tear on the braking system.

Furthermore, with such brakes, the driver is unable to control the strength of the braking action. In certain circumstances, that may prove to be a disadvantage. For example, in the case of hill starts, the driver is unable to operate the brakes and a complicated electronic control system needs to be provided.

In the case of controlled side skids, the driver is unable to use the hand brake to control the side skid.

Hand brake systems in which the driver maintains control over the strength of the braking still have some advantages. Specifically, the driver is able to meter the strength of the braking according to the lie of the land and avoid applying excessive braking in configurations which do not demand it, thus avoiding needless wear and tear on the braking system. The driver can also use the hand brake to perform a controlled side skid.

Furthermore, under the effect of heat the braking components may expand and the driver can meter the amount of braking according to the feedback he feels through his hand when operating the hand brake. Likewise, when this type of brake is being used as an emergency braking device, the amount of braking can be reduced if the wheels lock up.

By contrast, it is known that conventional hand brakes are sometimes difficult for certain drivers to use. For example, either, through lack of strength, these drivers are unable to apply their vehicle's hand brake firmly enough, or they do not know how to release it.

SUMMARY OF THE INVENTION

The invention provides a hand brake system that is able to resolve this disadvantage and can therefore easily be used by any driver while at the same time retaining the advantages of conventional hand brake systems.

The invention also has the advantage of providing a braking system that does not occupy a great deal of space.

The invention therefore relates to a brake booster intended to transmit hand brake commands, comprising: a control rod, a plunger able to move axially under the command of the control rod, an enclosure containing a moving wall dividing the inside of the enclosure into a working chamber and a vacuum chamber which is connected to a depression member. This wall is able to move axially under the effect of said plunger and/or of a difference in pressure between the vacuum chamber and the working chamber, a piston able also to move axially and secured to the moving wall of the enclosure, a three-way valve controlled by said plunger allowing the working chamber to be connected either to the vacuum chamber or to atmospheric air, a reaction disk of annular cross section, a bearing piece controlled by the piston allows the control rod to be driven along, an output rod passing through the center of the reaction disk, a control rod passing through the center of the reaction disk.

According to a preferred embodiment of the invention, the control rod is situated on the same side as the vacuum chamber and, under a braking command, exerts a pulling force on the plunger.

Provision may preferably be made for the output rod to be secured to the control rod.

Provision may also be made for the three-way valve to comprise a valve shutter capable of being in contact, according to its position: either with one face of the plunger, or with said face of the plunger and a face of the piston, or with said face of the piston.

According to one advantageous embodiment of the invention, the bearing piece has a reaction disk made of elastically deformable material and situated between the bearing piece and the piston.

The invention also relates to a vehicle hand brake applying the booster described hereinabove. It then comprises a manual control member mechanically coupled to said control rod and said output rod is intended to be mechanically coupled to wheel brakes of a vehicle.

In general, the invention also relates to a vehicle hand brake comprising a manual control member and a transmission cable (or rod) allowing braking commands to be transmitted to wheel brake devices that are to be operated. A brake booster is mechanically coupled to the transmission cable (or rod) and allows said braking commands to be transmitted to the brake devices.

Advantageously, said transmission cable (or rod) imparts pulling forces to the booster and the booster imparts pulling forces to the wheel brake devices.

BRIEF DESCRIPTION OF THE DRAWINGS

The various subjects and features of the invention will become more clearly apparent from the description which will follow and from the attached figures which depict.

DETAILED DESCRIPTION

Figure 1:
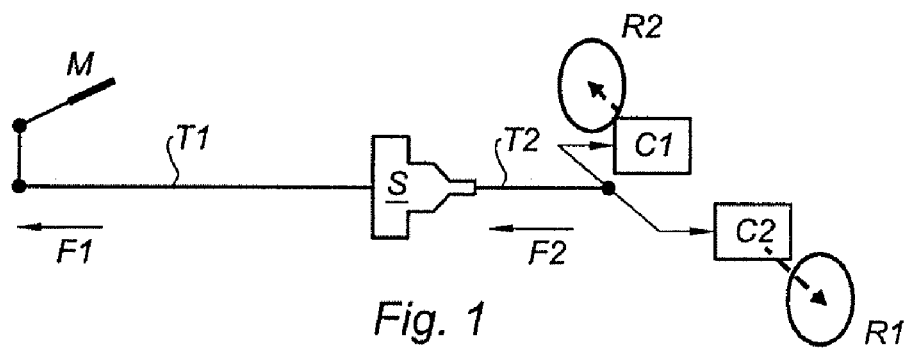
FIG. 1: a simplified overview of a hand brake system according to the invention.

A simplified exemplary embodiment of a hand brake system according to the invention will therefore be described with reference to FIG. 1.

This system comprises a manual control member such as a hand brake lever M which acts via a first system of cables or linkages T1 on a brake boosting system S. The latter acts via a second system of cables or linkages T2 on braking devices C1 and C2 associated with the wheels R1 and R2 of a vehicle.

The brake boosting system S that we shall term a booster S in the description that follows receives breaking commands which are imparted to it via the first system of cables T1 and imparts them in amplified form to the second system of cables T2 while at the same time leaving control of the braking to the user.

One specific feature of the booster S provided in this system is that it is controlled by a system of cables which act by pulling in the direction of the arrow F1 and that it imparts a braking force, also in terms of pulling, in the direction of the arrow F2. A booster such as this is therefore different than the brake boosters used in braking systems of the prior art, which boosters are controlled by rods operating by pushing (rather than by pulling) and impart a braking force to the brake master cylinders by pushing.

An exemplary embodiment of a brake booster according to the invention which can be applied to the braking systems of FIG. 1 controlled (for example) by a hand brake, will therefore be described with reference to FIG. 2.

This booster essentially comprises an enclosure 2 comprising a vacuum chamber 20 and a working chamber 21 which are separated by a moving wall 22. The vacuum chamber 20 is connected by an access 23 to a depression-creating system such as a vacuum pump operated by the vehicle engine.

A control rod 1 can move axially and allows control over the movement of a plunger 3.

A three-way valve comprising a valve shutter 4 and controlled by the plunger 3 makes it possible, depending on its position, to: place the working chamber 21 in communication with the vacuum chamber 20 (this is the position of rest depicted in FIG. 2), isolate the working chamber 21 from the vacuum chamber 20 (this is a start-off-braking phase), place the working chamber 21 in communication with atmospheric air (the booster provides a braking force).

Furthermore, a piston 5 is secured to the moving wall 22 and allows a pushing force to be exerted on a shoulder 10 of the rod 6 in the direction indicated by the arrow F1.

Finally, an output rod 6 is able to move axially with respect to the rod 1 limited by the J2 and allows a braking force to be imparted from the booster to the system of cables T2 in FIG. 1.

The way in which such a booster works is therefore as follows.

Figure 2:
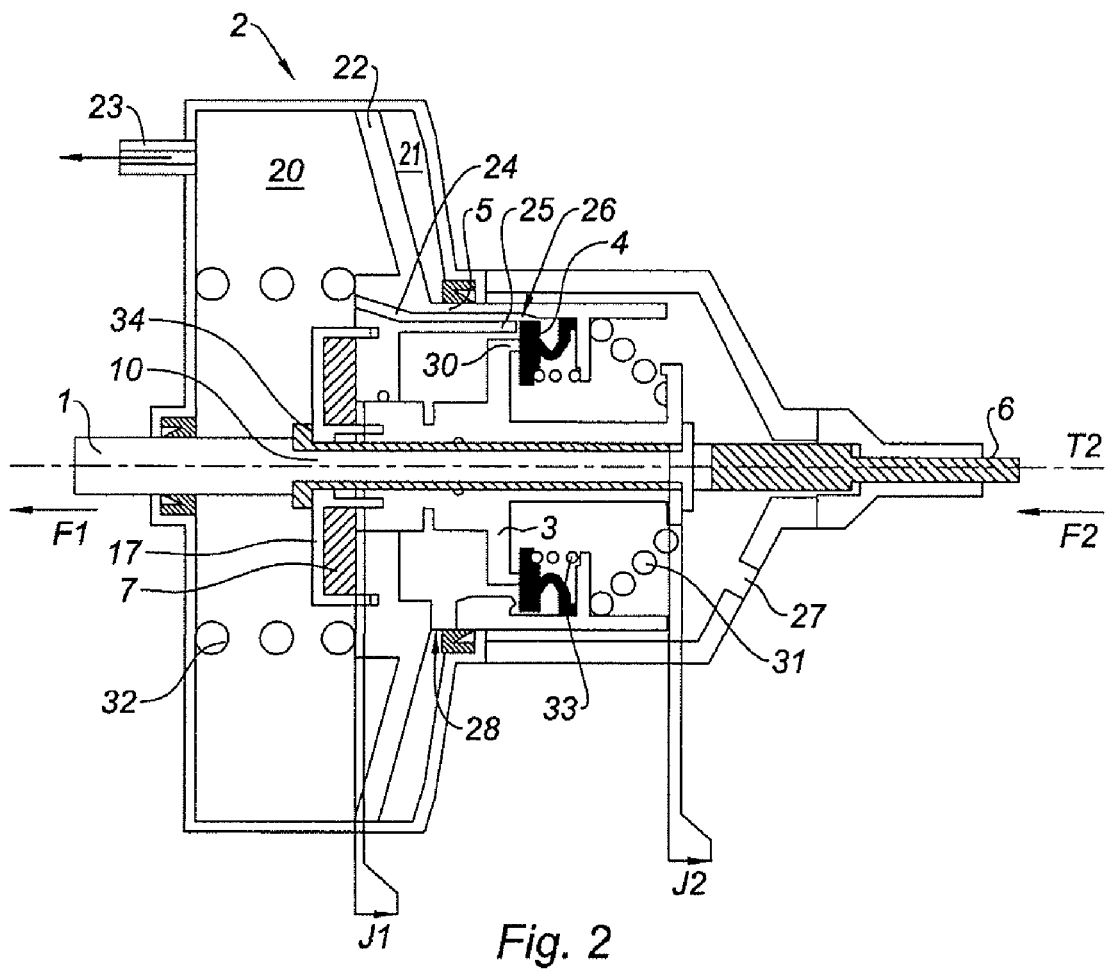
FIG. 2: a brake booster that can be applied to the system of FIG. 1.

At rest, in the absence of a braking command, the booster is in the situation depicted in FIG. 2. The plunger has its surface 30 in contact with the valve shutter 4. The surface 25 of the piston 5 is not in contact with the valve shutter 4. The vacuum chamber 20 is in communication with the working chamber 21 via a communication space 26.

The working chamber 21 is therefore isolated from atmospheric air and is in the same vacuum condition as the vacuum chamber 20. No pressure force is exerted on the moving wall 22.

When the driver of the vehicle operates the hand brake lever, a pulling force is exerted via the system of cables T1 in the direction of the arrow F1 on the control rod 1 and the latter moves to the left (as drawn in FIG. 2).

This movement of the control rod 1 is transmitted to the plunger 3 which moves to the left. The surface 30 of the plunger moves to the left. The spring 33 pushes the valve shutter 4 to the left and the valve shutter therefore moves with the plunger.

The valve shutter 4 comes into contact with the surface 25 of the piston 5. The communication space 26 for communication between the vacuum chamber 20 and the working chamber 21 is interrupted. The vacuum chamber is isolated from the working chamber.

The rod 1 continues to move to the left and carries the plunger 3 with it. The surface 30 of the plunger becomes separated from the valve shutter 4 the movement of which is halted by the surface 25 of the piston 5. The working chamber 21 is thus placed in communication with atmospheric air: via the communication space 28, via a communication space which has just been created between the surface 30 of the plunger 3 and the valve shutter 4 and via an ambient-air access 27 provided in the wall of the booster.

The pressure in the vacuum chamber 20 is low whereas the working chamber 21 is at a higher pressure. The air contained in the working chamber therefore exerts pressure on the moving wall 22 which moves to the left. As it moves, the wall 22 drives along the piston 5 which itself drives along the bearing piece 17. The latter bears against the shoulder 10 of the control rod 6.

In this operation, the pulling force of the output rod 6 on the system of cables in FIG. 1 is initiated by the force imparted by the hand brake lever to the control rod, then the moving wall of the booster applies a force to the shoulder 10 allowing the output rod 6 to exert a pulling force needed to operate the brakes.

A reaction disk 7 of annular cross section may also be associated with the bearing piece 17. The piston 5 used to transmit the boost force to the output rod 6 acts on the bearing piece 17 through a reaction disk made of a deformable material such as an elastomer.

At rest, there is a small clearance j1 between the front end of the plunger 3 and the reaction disk 7. When the driver of the vehicle begins to actuate the brake lever, this small clearance allows the plunger to move immediately without acting on the reaction disk 7 in order to operate the booster means and ensure immediate braking response.

Thereafter, the piston 3 acts on the reaction disk 7 and therefore on the shoulder 10 of the control rod 6 via the bearing piece 17.

It can be seen that the reaction to the operating of the hand brake lever begins to appear only when the boost force generated by actuating the hand brake lever exceeds a certain threshold level. This level is termed the booster "jump". It is an important feature of the booster. Indeed, while the existence of the jump is necessary so that the brakes will respond when the hand brake lever is actuated, the value of this jump remains within certain limits so that the degree of boost effort does not become excessive without an increase in the force that has to be applied via the hand brake lever.

The invention claimed is:

1. Brake booster intended to transmit hand brake cable commands, comprising a control rod (1), a plunger (3) able to move axially under the command of the control rod (1), an enclosure (2) containing a moving wall (22) dividing the inside of the enclosure into a working chamber (21) and a vacuum chamber (20) which is connected to a vacuum generator, said wall being able to move axially under the effect of said plunger (3) which creates a difference in pressure between the vacuum chamber and the working chamber, a piston (5) able also to move axially and secured to the moving wall (22) of the enclosure, a three-way valve (4) controlled by said plunger (3) allowing the working chamber (21) to be connected either to the vacuum chamber or to atmospheric air, a reaction disk, and an output rod (6) passing through the center of the reaction disk (7), the control rod (1) passing through the center of the reaction disk (7), wherein the control rod (1) is situated on the same side as the vacuum chamber (20) and, under a braking command, exerts a pulling force on the plunger (3).

2. Booster according to claim 1, characterized in that the three-way valve comprises a valve shutter (4) capable of being in contact, according to its position: either with one face

(30) of the plunger (3), or with said face (30) of the plunger (3) and a face (25) of the piston (5), or with said face (25) of the piston (5).

3. Booster according to claim 1, characterized in that the reaction disk (7) is made of elastically deformable material and situated between a bearing piece and the piston.

4. Booster according to claim 1, characterized in that the reaction disk (7) is of annular cross section.

5. Vehicle handbrake applying a brake booster, the brake booster comprising a control rod (1), a plunger (3) able to move axially under the command of the control rod (1), an enclosure (2) containing a moving wall (22) dividing the inside of the enclosure into a working chamber (21) and a vacuum chamber (20) which is connected to a vacuum generator, said wall being able to move axially under the effect of said plunger (3) which creates a difference in pressure between the vacuum chamber and the working chamber, a piston (5) able also to move axially and secured to the moving wall (22) of the enclosure, a three-way valve (4) controlled by said plunger (3) allowing the working chamber (21) to be connected either to the vacuum chamber or to atmospheric air, a reaction disk, and an output rod (6) passing through the center of the reaction disk (7), the control rod (1) passing through the center of the reaction disk (7), characterized in that the vehicle handbrake comprises a manual control member (M) mechanically coupled to said control rod (1), said output rod (6) being mechanically coupled to wheel brakes (C1, C2) of a vehicle, wherein the control rod (1) is situated on the same side as the vacuum chamber (20) and, under a braking command, exerts a pulling force on the plunger (3).

6. Vehicle handbrake according to claim 5, characterized in that the three-way valve comprises a valve shutter (4) capable of being in contact, according to its position: either with one face (30) of the plunger (3), or with said face (30) of the plunger (3) and a face (25) of the piston (5), or with said face (25) of the piston (5).

7. Vehicle handbrake according to claim 5, characterized in that the reaction disk (7) is made of elastically deformable material and situated between a bearing piece and the piston.

8. Vehicle handbrake according to claim 5, characterized in that the reaction disk (7) is of annular cross section.

9. Vehicle handbrake comprising a manual control member (M) and a transmission cable or rod (T1) allowing braking commands to be transmitted to wheel brake devices (C1, C2) that are to be operated, characterized in that it comprises a brake booster (S) comprising a control rod (1), a plunger (3) able to move axially under the command of the control rod (1), an enclosure (2) containing a moving wall (22) dividing the inside of the enclosure into a working chamber (21) and a vacuum chamber (20) which is connected to a vacuum generator, said wall being able to move axially under the effect of said plunger (3) which creates a difference in pressure between the vacuum chamber and the working chamber, a piston (5) able also to move axially and secured to the moving wall (22) of the enclosure, a three-way valve (4) controlled by said plunger (3) allowing the working chamber (21) to be connected either to the vacuum chamber or to atmospheric air, a reaction disk, and an output rod (6) passing through the center of the reaction disk (7), the control rod (1) passing through the center of the reaction disk (7), the brake booster mechanically coupled to the transmission cable or rod (T1) and allowing said braking commands to be transmitted to the brake devices (C1, C2), wherein said transmission cable or rod (T1) imparts a pulling force to said booster and in that the booster imparts a pulling force to the wheel brake devices (C1, C2).

10. Vehicle handbrake comprising a manual control member (M) and a transmission cable or rod (T1) allowing braking commands to be transmitted to wheel brake devices (C1, C2) that are to be operated, characterized in that it comprises a brake booster (S) comprising a control rod (1), a plunger (3) able to move axially under the command of the control rod (1), an enclosure (2) containing a moving wall (22) dividing the inside of the enclosure into a working chamber (21) and a vacuum chamber (20) which is connected to a vacuum generator, said wall being able to move axially under the effect of said plunger (3) which creates a difference in pressure between the vacuum chamber and the working chamber, a piston (5) able also to move axially and secured to the moving wall (22) of the enclosure, a three-way valve (4) controlled by said plunger (3) allowing the working chamber (21) to be connected either to the vacuum chamber or to atmospheric air, a reaction disk, and an output rod (6) passing through the center of the reaction disk (7), the control rod (1) passing through the center of the reaction disk (7), the brake booster mechanically coupled to the transmission cable or rod (T1) and allowing said braking commands to be transmitted to the brake devices (C1, C2), characterized in that the control rod (1) is situated on the same side as the vacuum chamber (20) and, under a braking command, exerts a pulling force on the plunger (3).

11. Handbrake according to claim 9, characterized in that the three-way valve comprises a valve shutter (4) capable of being in contact, according to its position: either with one face (30) of the plunger (3), or with said face (30) of the plunger (3) and a face (25) of the piston (5), or with said face (25) of the piston (5).

12. Handbrake according to claim 9, characterized in that the reaction disk (7) is made of elastically deformable material and situated between a bearing piece and the piston.

13. Handbrake according to claim 9, characterized in that the reaction disk (7) is of annular cross section.

14. Handbrake according to claim 10, characterized in that the three-way valve comprises a valve shutter (4) capable of being in contact, according to its position: either with one face (30) of the plunger (3), or with said face (30) of the plunger (3) and a face (25) of the piston (5), or with said face (25) of the piston (5).

15. Handbrake according to claim 10, characterized in that the reaction disk (7) is made of elastically deformable material and situated between a bearing piece and the piston.

16. Handbrake according to claim 10, characterized in that the reaction disk (7) is of annular cross section.

* * * * *